US011348132B1

(12) United States Patent
Field et al.

(10) Patent No.: US 11,348,132 B1
(45) Date of Patent: May 31, 2022

(54) SYSTEM AND METHOD FOR APPLYING BENEFITS TO TRANSACTIONS

(71) Applicant: JPMorgan Chase Bank, N.A., New York, NY (US)

(72) Inventors: Manning Field, Media, PA (US); Matthew Kane, Haddonfield, NJ (US); Mical Jeanlys, Swarthmore, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 848 days.

(21) Appl. No.: 15/151,043

(22) Filed: May 10, 2016

Related U.S. Application Data

(63) Continuation-in-part of application No. 11/968,036, filed on Dec. 31, 2007.

(51) Int. Cl.
  *G06Q 30/02* (2012.01)
(52) U.S. Cl.
  CPC ..... *G06Q 30/0215* (2013.01); *G06Q 30/0235* (2013.01)
(58) Field of Classification Search
  USPC ................................................ 705/14, 14.17
  See application file for complete search history.

(56) References Cited

U.S. PATENT DOCUMENTS

| | | | |
|---|---|---|---|
| 5,822,410 A | 10/1998 | McCausland et al. | |
| 6,070,147 A | 5/2000 | Harms et al. | |
| 6,334,109 B1 | 12/2001 | Kanevsky et al. | |
| 6,681,988 B2 | 1/2004 | Stack et al. | |
| 7,318,049 B2 | 1/2008 | Iannacci | |
| 7,392,222 B1 | 6/2008 | Hamilton et al. | |
| 7,747,528 B1 | 6/2010 | Robinson et al. | |
| 2002/0010643 A1* | 1/2002 | Chaves | G06Q 30/0617 705/26.43 |

(Continued)

OTHER PUBLICATIONS

Project Financing and How It Affects Credit Ratings Korthals, Robert W. Business Quarterly; London vol. 40, Iss. 2, (Summer 1975): 76. https://www.proquest.com/docview/225379845/ 47C5C00C92724062PQ/4?accountid=14753 (Year: 1975).*

(Continued)

*Primary Examiner* — Hani M Kazimi
*Assistant Examiner* — Hatem M Ali
(74) *Attorney, Agent, or Firm* — Greenberg Traurig LLP

(57) ABSTRACT

Systems and methods for presenting an offer to a customer are disclosed. In one embodiment, a method may include (1) a computer application executed by an electronic device comprising a computer processor receiving a selection of a financing offer from a customer; (2) the computer application receiving, from a back end server, an identification of at least one transaction conducted with a financial instrument that is eligible for the financing offer; (3) the computer application presenting the customer with the at least one eligible transaction; (4) the computer application receiving a selection of one of the at least one eligible transactions; (5) the computer application presenting the customer with at least one option associated with the financing offer; (6) the computer application receiving a selection of one of the (Continued)

options; and (7) the computer application communicating the selection of the transaction and the option to the back end server.

18 Claims, 10 Drawing Sheets

(56) References Cited

U.S. PATENT DOCUMENTS

| | | | |
|---|---|---|---|
| 2002/0063153 A1 | 5/2002 | Stack | |
| 2003/0055727 A1* | 3/2003 | Walker | G06Q 20/20 705/14.17 |
| 2003/0220834 A1 | 11/2003 | Leung et al. | |
| 2004/0002897 A1 | 1/2004 | Vishik | |
| 2004/0158521 A1* | 8/2004 | Newton | G06Q 20/10 705/38 |
| 2006/0053056 A1 | 3/2006 | Alspach-Goss et al. | |
| 2006/0085340 A1 | 4/2006 | Hung | |
| 2006/0259364 A1 | 11/2006 | Strock et al. | |
| 2008/0071559 A1* | 3/2008 | Arrasvuori | G06T 19/006 705/26.1 |
| 2008/0262919 A1 | 10/2008 | Ang et al. | |
| 2014/0058815 A1* | 2/2014 | Hiremath | G06Q 20/384 705/14.17 |
| 2018/0365726 A1* | 12/2018 | Comerford | G06Q 30/0224 |

OTHER PUBLICATIONS

Regional differences in mortgage financing costs: a reexamination Ostas, James R.The Journal of Finance; Cambridge vol. 32, Iss. 5, (Dec. 1977): 1774. https://www.proquest.com/docview/194700668/47C5C00C92724062PQ/9?accountid=14753 (Year: 1977).*

An Economic Model of Trade Credit Schwartz, Robert A.Journal of Financial and Quantitative Analysis; Seattle vol. 9, Iss. 4, (Sep. 1974): 643 https://www.proquest.com/results/47C5C00C92724062PQ/1?accountid=14753 (Year: 1974).*

Author: Markus Jakobsson: Solution to the Problem:: Wiley—IEEE eBook Chapter: Publication Date: Jan. 1, 2012; ISBN (Online): 9781118312551; ISBN (Electronic): 9781118312544; (Year: 2012).*

Authors: Park et al.: Leveraging Cellular Infrastructure to Improve Fraud Prevention; IEEE Conference Paper: IEEE Xplore:; Publication Date: Dec. 1, 2009; Conference Start Date: Dec. 7, 2009; Conference End Date: Dec. 11, 2009 (Year: 2009).*

Walmart Website on Bill Me Later. Jul. 20, 2006. http://web.archive.org/web/20060720001357/www.walmart.com/catalog/bml_popup.jsp http://web.archive.org/web/20060720001357/http://www.walmart.com/catalog/bml_terms_conditions.jsp.

Sweetwater Music Technology Direct website entitled Sweetwater Musician's All Access Platinum Card. Mar. 20, 2006. https://web.archive.org/web/20060320205940/http://www.sweetwater.com/financing/allaccess.php.

* cited by examiner

US 11,348,132 B1

SYSTEM AND METHOD FOR APPLYING BENEFITS TO TRANSACTIONS

RELATED APPLICATIONS

The present application is a Continuation-in-Part of U.S. patent application Ser. No. 11/968,036, filed Dec. 31, 2007, the disclosure of which is hereby incorporated, by reference, in its entirety.

FIELD OF THE INVENTION

The present invention relates to the application of benefits or rewards to transactions. More particularly, the present invention relates to systems and methods that enable customers, for example, to dynamically identify particular transactions that should receive a particular benefit or reward.

BACKGROUND

Everyone uses credit cards and other like vehicles to enter into purchase transactions. Merchants, banks and other financial institutions, for example, commonly offer their customers cards (e.g., credit cards, debit cards, stored value cards, or gift cards) or other account and non-account based instruments that customers can use in place of cash to make purchases at any number of merchants and locations. In exchange for the convenience offered, transactions made with cards are typically charged an interest that is applied to the balance maintained.

A card issuing bank may also provide incentives (e.g., rebates or discounts) on purchases made with the card or account or through a particular vendor or merchant. Rewards may also include cash-back deals where the customer earns a percentage of the transaction amounts as cash value that gets added to the card member's account. In some cases, a customer may redeem accumulated reward value (e.g., points, miles, etc.) for predetermined rewards that may comprise products or services available through a particular vendor. For example, a credit card sponsored by an airline may reward the user with airline miles that may be redeemed for free or discounted travel. Likewise, some cards earn store dollars that can be used as virtual cash to make purchases through select merchants and vendors.

Although conventional systems and methods provide customers with a wide variety of reward earning opportunities, they nonetheless suffer from several notable drawbacks. For example, current systems and methods do not enable customers to selectively determine which transactions will receive a particular reward or benefit, such as zero or reduced interest on a particular transaction. Further, existing systems and methods do not permit the dynamic identification and application of benefits or rewards to particular transactions based on customer or transaction history or any data or information that may readily be used to identify and apply benefit(s) or reward(s) to at least one transaction.

Thus, what is needed is a system and method that, among other things, (1) enables a customer to selectively identify particular transaction(s) that are to receive a benefit or reward, and (2) dynamically identifies and applies benefits or rewards to particular transactions based on customer or transaction history or any data or information that may readily be used to identify and apply benefit(s) or reward(s) to at least one transaction.

SUMMARY OF EMBODIMENTS

According to various embodiments, the systems and methods described herein may allow a customer of a financial institution, for example, to control the payment of purchases and the accrual of benefits or rewards on a transaction-by-transaction basis. For example, a customer having a credit card or other transaction card or device through a bank may get to pay on his or her terms, such as by applying particular benefits or rewards to a transaction that effectively keeps the customer liquid. Select customers, for example, may earn the right to "pause" a transaction such that the transaction receives a benefit or reward for a period of time, until an event occurs, or the benefit or reward otherwise expires. Pausing a transaction may, for example, earn the customer a zero or promotional rate on the transaction or other reward or benefit that the customer may wish to apply. For example, a consumer may purchase a TV for $500 which the consumer may dynamically select to pause the transaction for 12 months. During that time, the consumer will not incur interest on $500 balance. A pause may result in the application of any other benefit or reward. In some embodiments, a consumer may pause only a portion of the transaction, such as $250 of the total $500. Another example of a benefit or reward may be extending the payment due date for the desired transaction. In some embodiments, a reward may be provided to the customer, the transaction or a portion of it may be paid on behalf of the customer, or some bonus may be given for utilizing pauses, for example.

In some embodiments, the consumer may make the decision on a transaction-by-transaction basis, according to specified business rules (e.g., only 3 pauses per year, or $5000 total for pauses at any given time, etc.). Consumers can be updated on particulars of pauses, such as how many/much left, how much time left on initiated pauses, etc. In some embodiments, notifications can be sent to the customer informing the customer of pauses that are available for redemption based on the customer's transaction history. For example, a customer making a purchase at a sporting goods store may receive a message, call or other notification on the customer's telephone, computer, personal digital assistant (PDA) informing the customer that certain pauses (or other benefits or rewards) are available to be applied to the purchase transaction. The customer, upon receiving the notification, may indicate whether the pause, benefit or reward should be applied or declined, for example.

In some embodiments, back-end payment processing with the various systems and methods described herein enable a consumer to pay for a paused transaction and have it applied accordingly. Therefore, if the consumer paid $500 on the TV after 6 months (out of a 12 month period of pause time), the system would pay it off entirely without charging the consumer any interest or a different (e.g., reduced) interest. Alternatively, the $500 may be applied against any interest earning balance the consumer may have. For example, if the customer had another balance that was generating interest, the $500 may be directed to that account, rather than towards to the non-interest generating balance associated with the T.V. In some embodiments, pauses may be applied in anticipation of a transaction(s), at the time thereof, or retro-actively. For example, a consumer can selectively apply pauses at the time a bill for transactions it received or prior to payment. The bill can included check boxes for the consumer to specify pauses, which when received by bank can lead to recalculation of the amount due/interest charges, etc. Pauses can also be selected online.

In some embodiments, consumers may "earn" the ability to pause based on transaction history or any other data or information that may be used to earn the ability to selectively apply benefits or rewards to particular transactions.

For example, customers that timely pay balances would be offered x pauses. For example, you spend x dollars, you earn y dollars worth of pauses. Pauses may also be time-limited. Thus, a customer may be provided with $10,000 worth of pauses (or 10 pauses) for use during a 12-month period.

In some embodiments, a pause may be purchased, or may be redeemed for reward points, for example. In some embodiments, a consumer may pause a transaction by logging onto an online statement and initiating an icon associated with the transaction, calling the bank and requesting the pause, or initiating a pause button or icon at the POS, or on a hand-held device that may be used to initiate and enter into a transaction. Other examples are of course possible.

In some embodiments, pauses may apply to an aggregate balance or transactions, such as all purchases made which relate to furnishings, groceries, dining, vacation expenses, or other category, for example. Thus, pauses can be applied by the consumer on a line-by-line basis (i.e., individual transaction), on aggregate balances or transactions, date ranges (e.g., go on vacation and want purchases made during the vacation paused), or a combination of both. In some embodiments, particulars of pauses may be based on the product/service purchased, the type of merchant, the amount of the transaction, etc. In some embodiments, pauses may be applied at the customer level, rather than at the transaction level, so that all transactions associated with a customer or the customer's family may be paused.

In some embodiments, a consumer may be given a choice of how long the pause is desired and/or what rate or other benefit or reward should be applied during the pause. In some embodiments, the consumer may select any number of variables (e.g., financial terms) that would apply during the pause term. For example, the customer may specify when the pause starts/stops, duration of the pause, the balance applied, interest rate or fee, how many reward points or value to charge the customer for the pause.

In some embodiments, pauses may be rewarded based on purchase/transaction history without the customer even knowing. That is, a customer who always pays on time, but for some reason did not do so this month. In this case a pause of the payment due date may be rewarded. Or, if the customer makes a big purchase, a pause on interest can be rewarded. In some embodiments, a customer may develop a profile that specifies scenarios or circumstances under which a pause or pauses should be dynamically applied. The customer may also designate periods of time when pause(s) should be dynamically applied to select or all of the customer's transactions.

In some embodiments, a customer may be presented with a plurality of benefits or rewards that may be applied to a particular transaction. For example, a customer may be given a choice between zero interest for a certain period of time, a discounted purchase or transaction amount, cash back, or any other benefit or reward that may be applied against a selected transaction. The customer may then select one or a combination of the available benefits or rewards to apply against select transactions. The plurality of benefits or rewards may be presented based on the particular of a transaction (e.g., product or service purchased, identity of merchant, location of transaction, etc.) on a customer's designated preferences, or other parameter that may be used to offer a plurality of benefits or rewards for redemption. In some embodiments, the plurality of benefits or rewards may be presented following the occurrence of a transaction (e.g., at the POS), after a transaction is processed or posted, or before transactions occur (e.g., during customer registration or as part of a customer's designation of preferred benefits or rewards.)

According to one embodiment of the systems and methods described herein, a method for processing transactions is provided. The method comprising the steps of: receiving a transaction benefit designation from a user designating at least one transaction the user selects to receive a benefit, wherein the transaction benefit designation comprises a desired benefit applicable to the transaction, and wherein the desired benefit is selected from a plurality of possible choices; applying the benefit to the transaction; and expiring the benefit after a period of time or the occurrence of an event.

In another embodiment of the systems and methods described herein, a system for processing a transaction is provided. The system comprising: a transaction benefit processor for receiving a transaction benefit designation from a user designating at least one transaction the user selects to receive a benefit, wherein the transaction benefit designation comprises a desired benefit and is electronically submitted over a communications network; benefit application module for applying the benefit to the transaction; and a benefit expiration processor for expiring the benefit after a period of time or the occurrence of an event.

In still another embodiments of the systems and methods described herein, a method for identifying and applying a benefit or reward to a transaction is provided. The method comprising the steps of: determine at least one particular of a customer; identify at least one benefit or reward based on the at least one particular of the customer, wherein the at least one benefit or reward may be selectively applied by the customer or dynamically applied to at least one transaction; identify at least one transaction of the customer based on the at least one particular of the customer; and apply the at least one benefit or reward to the at least one transaction of the customer.

In yet another embodiment of the systems and methods described herein, a method for identifying and applying a benefit or reward to a transaction is provided. The method comprising the steps of: determine at least one particular of a customer; identify at least one benefit or reward based on the at least one particular of the customer, wherein the at least one benefit or reward may be selectively applied by the customer or dynamically applied to at least one transaction; determine at least one particular of the at least one benefit or reward; and update a customer's account of benefits and rewards to include the at least one benefit or reward based.

Methods for presenting an offer to a customer are disclosed. In one embodiment, a method may include a computer application executed by an electronic device comprising a computer processor receiving a selection of a financing offer from a customer; the computer application receiving, from a back end server, an identification of at least one transaction conducted with a financial instrument that is eligible for the financing offer; the computer application presenting the customer with the at least one eligible transaction; the computer application receiving a selection of one of the at least one eligible transactions; the computer application presenting the customer with at least one option associated with the financing offer; the computer application receiving a selection of one of the options; and the computer application communicating the selection of the transaction and the option to the back end server.

In one embodiment, the eligibility of the transaction may be based on a transaction amount, a good or service, etc.

In one embodiment, the option may be a term for the financing offer.

In one embodiment, the method may further include the computer application presenting the customer with a financing cost based on the selected option.

In one embodiment, the financing offer may have an interest rate that is lower than an interest rate of an account for the customer.

In one embodiment, the transaction may be removed from the account associated with the financial instrument.

According to another embodiment, a method for presenting an offer to a customer may include a computer application executed by a computer processor in an electronic device receiving, over a communication network, a purchase offer for a good or service from a merchant; the computer application presenting the purchase offer to the customer; the computer application determining that the customer has purchased the good or service with a financial instrument; and the computer application communicating the purchase to a back end server.

In one embodiment, the method may further include the computer application receiving, from a location sensing device on the electronic device, a location of the electronic device; the computer application identifying at least one merchant associated with the location; and the computer application initiating a communication with the merchant.

In one embodiment, the method may further include the computer application broadcasting a query; and the computer application receiving, from the merchant, a response to the query. In one embodiment, the response may include the purchase offer.

In one embodiment, the purchase offer may be part of a beacon broadcast.

In one embodiment, the transaction may be removed from the account associated with the financial instrument.

In one embodiment, the computer application determining that the customer has purchased the good or service with a financial instrument may include the computer application comparing a good or service in the transaction with a good or service in the purchase offer.

In one embodiment, the computer application may be a payment application, and the purchase offer may be presented in the payment application.

According to another embodiment, a method for presenting an offer to a customer may include a back end server comprising a computer processor receiving, over a payment network, a transaction conducted by a customer with a merchant using a financial instrument; the back end server determining that the transaction is eligible for a financing offer; the back end server communicating the financing offer to the customer with at least one option; the back end server receiving acceptance of the financing offer and a selection of one of the options from the customer; and the back end server applying the accepted financing offer and the selected option to the transaction.

In one embodiment, the eligibility of the at least one transaction may be based on a transaction amount.

In one embodiment, the eligibility of the at least one transaction may be based on a good or service.

In one embodiment, the at least one option may include a term for the financing offer.

In one embodiment, the acceptance of the financing offer may be received from a computer application executed by a computer processor in an electronic device.

Other embodiments may also be considered.

DETAILED DESCRIPTION OF EXEMPLARY EMBODIMENTS

Figure 1:
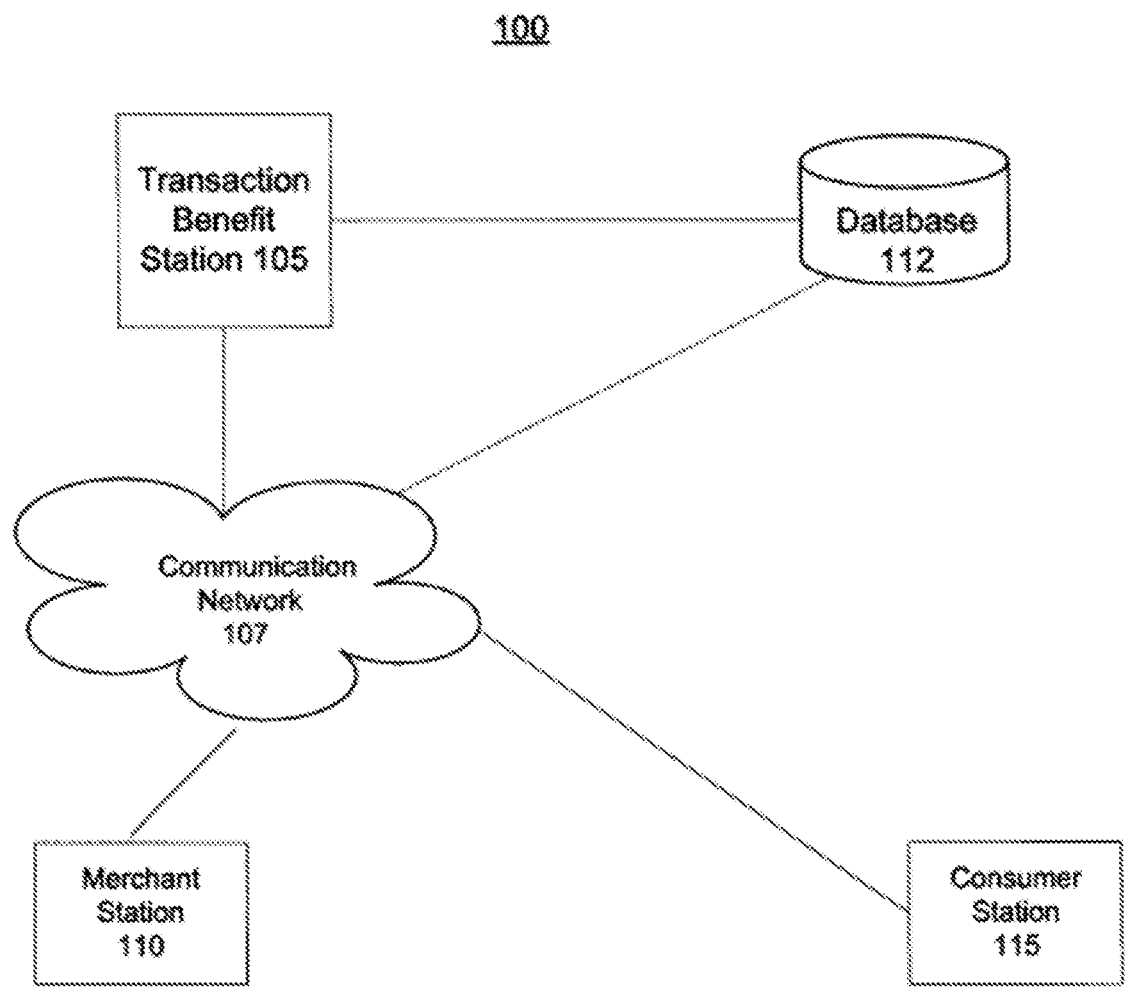
FIG. 1 shows an exemplary system 100 for applying benefits to transactions, according to various embodiments.

Reference will now be made to the present preferred embodiments, examples of which are illustrated in the accompanying drawings in which like reference characters refer to corresponding elements.

The present invention is described to a system and method for identifying and applying benefits or rewards to at least one transaction. Nonetheless, the characteristics and parameters pertaining to the identification and application of other features to at least one transaction.

While the exemplary embodiments illustrated herein may show the various embodiments (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Among many potential uses, the systems and methods described herein may be used to: (1) induce customer loyalty by providing flexible options for applying rewards and benefits to particular transactions; (2) allow customers to make purchases or inquiries (online or at a particular location) on desired products and services and selectively determine which purchases will receive zero or reduced interest rate or other benefit or reward; (3) allow merchants, banks, financial service providers, or other entity a system and method for dynamically rewarding customer behavior; (4) allow administrators of reward programs the ability to enhance the appeal of such reward programs to its customers or participants; (5) enable merchants to have greater cash flow; (6) allow merchants or partners of the administrator of system 105 to reward customers; (7) allow the targeting of promotional spending. Other uses are possible.

FIG. 1 illustrates a system 100 for identifying and applying benefits or rewards to at least one transaction according to one embodiment. System 100 may comprise a transaction benefit station 105 for identifying and applying benefits or rewards to at least one application, either upon direction of a customer or dynamically based on any data or information that may readily be used to identify and apply appropriate benefits or rewards to at least one transaction. In some embodiments, transaction benefit station 105 may be administered by a bank or financial institution that issues and administers cards (e.g., a card-issuer), a merchant or vendor that sponsors cards (e.g., a sponsor), or any individual, entity or third party that coordinates, manages or administers customer use of cards or other vehicles to conduct transactions. In some embodiments, transaction benefit station 105 may maintain or have access to particulars about customers, benefits or rewards, reward programs, transaction histories, merchants, and any data and information that may be used to identify and apply benefits or rewards to at least one transaction according to the systems and methods described herein. In some embodiments, transaction benefit station 105 may comprise a central headquarters or distributed network or repository of the various features and functions of the systems and methods described herein, and may be maintained by any party or entity that administers the coordination of data and information in connection with the identification and application of benefits or rewards to particular transactions according to the systems and methods described herein.

Transaction benefit station 105 may comprise a single server or engine (as shown). In another embodiment, transaction benefits station 105 may comprise a plurality of servers or engines, dedicated or otherwise, which may further host modules for performing desired system functionality. Transaction benefits station 105, for example, may host one or more applications or modules that function to permit interaction between the users of system 100 (e.g., sponsors, customers, the administrator of transaction benefits station 105, and any other relevant parties) as it relates to exchanging and processing of data and information related to the identifying and/or application of benefits or rewards as described herein, for example. For instance, transaction benefits station 105 may include an administration module that serves to permit interaction between the system 100 and the individual(s) or entity(ies) charged with administering system 100 or transaction benefit station 105. Such an administration module may enable the agent of transaction benefits station 105, for example, to input information related to benefits or rewards, including but not limited to parameters used to determine which transactions, customers, products, services, or merchants, for example, may be offered particular benefits or rewards, and how data or information related to the identification and application of benefits or rewards is gathered and analyzed in connection with the features and functionality described herein. Such parameters may comprise variables that define a particular pool or segment of benefits or rewards that may be dynamically applied to particular customers or transactions based on any relevant data or information. Thus, if a customer who historically makes timely payments suddenly misses a payment, the various systems and methods described herein may dynamically apply a benefit to that customer's transactions that pushes back the payment deadline. Other examples are of course possible.

According to various embodiments, an agent of transaction benefits station 105 may interface with a graphical user interface (or GUI) to input: (1) data or information (e.g., terms, words, phrases, or digits) that enable the agent to define particular pools of benefits or rewards, (2) data or information that enable the agent to define particulars of benefits or rewards that may be used by customers to make benefit designations, (3) data or information that enable the agent to define particulars about merchants or sponsors through which products or services may be purchased and/or delivered, (4) rules, parameters and algorithms used to identify which benefits or rewards are offered to customers, and (5) rules, parameters and algorithms used to identify which customers or transactions are eligible for benefits or rewards. An agent of transaction benefit station 105 may also input information or data regarding how customers, benefits or rewards, or any other data or information used by the systems and methods described herein are stored (e.g., categorized) in a database 112, for example. Other modules may permit processing of the various features and functionality described herein for providing products and services via a reward program (See FIG. 2 for modules associated with transaction benefit station 105).

Transaction benefits station 105 may include, for instance, a workstation or workstations running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

Data and information maintained by transaction benefit station 105 may be stored and cataloged in database 112 which may comprise or interface with a searchable database. Database 112 may comprise, include or interface to a relational database. Other databases, such as a query format database, a Standard Query Language (SQL) format database, a storage area network (SAN), or another similar data storage device, query format, platform or resource may be used. Database 112 may comprise a single database or a collection of databases, dedicated or otherwise. In one embodiment, database 112 may store or cooperate with other databases to store the various data and information described herein. In some embodiments, database 112 may comprise a file management system, program or application for storing and maintaining data and information used or generated by the various features and functions of the systems and methods described herein. In some embodiments, database 112 may store, maintain and permit access to customer information, sponsor or reward category information, and general information used to identify and offer reward categories, as described herein. In some embodiments, database 112 is connected directly to mobile rewards station 105, which, in some embodiments, it is accessible through a network, such as communication network 107, for example.

Transaction benefits station 105 may, in some embodiments, be accessed via a communication network 107. Communications network 107 may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network 107 may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network 107 may comprise a satellite communications network, such as a direct broadcast communication system (DBS) having the requisite number of dishes, satellites and transmitter/receiver boxes, for example. Communications network 107 may also comprise a telephone communications network, such as the Public Switched Telephone Network (PSTN). In another embodiment, communication network 120 may comprise a Personal Branch Exchange (PBX), which may further connect to the PSTN.

As shown in FIG. 1, merchant station 110 and customer station 115 may communicate with transaction benefit station 105 via communication network 107. Merchant station 110 may comprise, for example, a station utilized by an agent of a merchant to interact or communicate with its customers or transaction benefit station 105. For example, merchant station 110 may comprise a call center facility or station of a card issuer or sponsor that is manned by an operator to receive calls from card members. In some embodiments, merchant station 110 may comprise a point-of-sale system or engine that processes merchant transactions with a customer and which may further cooperate or interact with external systems which carry out card and other transactions (e.g., credit card transactions), including without limitation, for example, transaction benefit station 105. In some embodiments, merchant station 110 may comprise or host web sites or web pages of a merchant that the merchant's customers may access to interact with the merchant, such as to make purchases and inquiries.

Customer station 115 may, in some embodiments, enable a customer of a merchant, the administrator of transaction benefit station 105, a rewards program participant, or any other person or entity that utilizes the systems and methods described herein to inquire about or purchase products or services (collectively, "customer") to interact and communicate with a merchant as represented by merchant station 110, for example, or with transaction benefit station 105 in connection with the various features and functionality described herein. For example, customer station 115 may enable a customer to call or access the web site or page of a merchant, for example, to browse and possibly purchase a product, or to communicate with transaction benefit station 105, such as by transmitting a transaction benefit designation that identifies at least one transaction that should receive a benefit or reward, such as a reduced interest rate, for example.

In some embodiments, customer station 115 may comprise any terminal (e.g., a typical home or personal computer system, telephone, personal digital assistant (PDA), POS of terminal, or other like device) whereby a customer may interact with a network, such as communications network 107, for example, that is responsible for transmitting and delivering data and information used by the various systems and methods described herein. Customer station 115 may comprise or include, for instance, a personal or laptop computer, a telephone, or PDA. Customer station 115 may include a microprocessor, a microcontroller or other general or special purpose device operating under programmed control. Customer station 115 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Customer station 115 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Customer station 115 may also include a network-enabled appliance, a browser-equipped or other network-enabled cellular telephone, or another TCP/IP client or other device.

Figure 2:
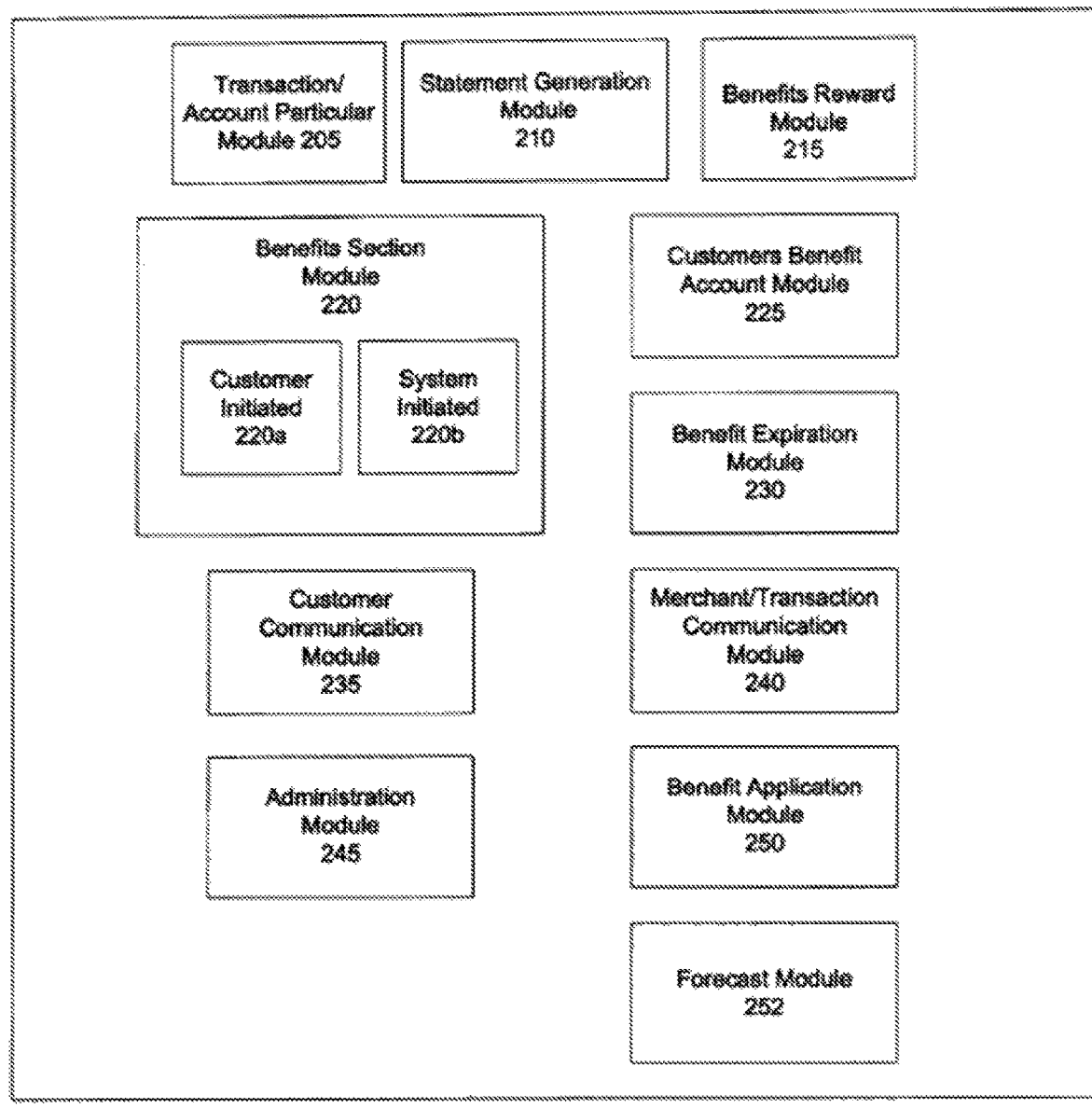
FIG. 2 illustrates various exemplary modules that may be associated with transaction benefit station 105, according to various embodiments.

FIG. 2 illustrates exemplary modules that may be associated with transaction benefits station 105 for carrying out (or administering) the various functions and features of the embodiments described herein. In some embodiments, the modules may: (1) be accessed by an agent or administrator of transaction benefit station 105, (2) store, maintain and administer particulars on benefits or rewards that are available to customers or transactions, (3) store, maintain and administer particulars on a plurality of customers, (4) evaluate a customer's transaction history, for example, to identify and apply benefit or rewards to select transactions, (5) apply benefits or rewards to select customers or transactions, (6) determine the expiration of benefits or rewards that have been applied to transactions, (7) generate and present transaction statements that customers may initiate to select transactions that should receive a particular benefit or reward, and (8) permit customers to transmit transaction benefit designations that specify particular transactions that are to receive a benefit or reward. Other features and functionality are of course possible. While the modules may not be used in all embodiments to perform some or all of the functions of the present invention, they are nonetheless presented as possible embodiments:

Transactions/account module 205 may, in some embodiments, receive transaction data and information from particular merchants through which customers are making purchases or otherwise entering into transactions. For example, transactions module may cooperate or interact with a merchant system and/or a card processing system to receive particulars on transactions, such as date of transaction, name of merchant, cost of transaction, product or service purchased or sold (e.g., via a SKU, UPC or other identifier), or any other data or information that may relate to a transaction. The data and information received through transactions/account module 205 may be referenced or accessed by the various systems and methods described herein (including the other modules in FIG. 2) to carry of the identification and application of benefits or rewards to particular customers or transactions.

In some embodiments, transactions/account module 205 may assess a customer's balances with a particular account, for example, to determine whether a pause or any other benefit or reward can be offered. In some embodiments, any particular of a customer's account, for example, may be considered. In some embodiments, a customer's behavior may also be used to determine which benefits or rewards may be offered the customer. For example, if the customer is communicating electronically with a bank, for example, the bank may designate the customer as being eligible to receive certain benefits or rewards, such as, for example, pauses on select aspects of the customer's accounts. Other forms of customer behavior that may be considered include without limitation online behavior, not missing a payment, frequenting select merchants or sponsors of the administrator of system 105, for example.

In some embodiments, transactions/account module 205 may present a customer with a plurality of benefits or rewards that may be applied to a particular transaction. For example, a customer may be given a choice between zero interest for a certain period of time, a discounted purchase or transaction amount, cash back, or any other benefit or reward that may be applied against a selected transaction. The customer may then select one or a combination of the available benefits or rewards to apply against select transactions. The plurality of benefits or rewards may be presented based on the particular of a transaction (e.g., product or service purchased, identity of merchant, location of transaction, etc.) on a customer's designated preferences, or other parameter that may be used to offer a plurality of benefits or rewards for redemption.

Statement generation module 210 may, in some embodiments, generate and present to customers statements that set forth the customer's transaction history. In some embodiments, the statements may be electronic and interactive, such that the customer can selectively specify or designate particular transactions which should receive a benefit or reward. For example, a customer may receive or access at consumer station 115, for example, an electronic statement through a graphical user interface (GUI) that the customer can initiate to specify transactions which should receive the benefit or reward. Such interface may include, for example, icons or buttons alongside individual transactions that the customer can initiate as desired. Customer selections may be processed by benefits selection module 220 and more specifically customer initiated module 220*a* discussed below. In some embodiments, the statement may be received via the mail and the customer can write or otherwise designate his or her preferences and mail or otherwise transmit the filled-out statement to the administrator of transaction benefit station 105 or other appropriate entity. In some embodiments, the customer may specify his or her preferences to the administrator of transaction benefit station 105 or other appropriate entity via a telephone call, electronic mail, instant message, or other form of communication.

Benefits reward module 215 may, in some embodiments, process and maintain data and information relating to benefits or rewards that are available to customers. For example, benefits or rewards may be stored and maintained by category, such as zero or reduced interest rates, delayed payment due dates, cash-back programs, proprietary programs (e.g., programs administered by the issuer of the card, loyalty programs (e.g., cards that are branded and reward loyalty to the sponsor), or any other type or category of benefits or rewards that may by the systems and methods described herein. Benefits or rewards may also be stored by good or device or by category of good or service. For example, a particular reward program may be associated with a particular product (e.g., as identified by SKU number), by retailer or merchant name, or by a general category, such as "grocery stores," for example. Other techniques for categorizing benefits or rewards are of course possible.

Benefits selection module 220 may, in some embodiments, designate which transactions are to receive benefits or rewards. In some embodiments, benefit selection module 220 may further comprise or interact with a customer initiated module 220*a* or a system initiated module 220*b*, each of which is discussed below.

Customer initiated module 220*a* may, in some embodiments, receive transaction benefit designations transmitted to transaction benefit station 105 by customers. For example, a customer may receive a statement which indicates which transactions have been entered into in during the statement period. The customer may control payment of statement balance by designating transactions which should receive a benefit or transaction. For example, if the customer has a limited budget for the month, he may designate that an expensive transaction not be counted toward the payment due, that a reduced interest be set, or that some other benefit or reward be applied that transaction. Toward this end, the customer may electronically transmit, for example, a designation to transaction benefit station 105 that particularly identifies the transaction(s) to which a benefit should be applied. In some embodiments, such a designation may comprise a particular of the transaction, such as the date, name of merchant, day of transaction, product or service (e.g. UPC, SKU, bar code reading, photograph) or any other identification that would permit transaction benefit station 105 to identify the transaction(s). In some embodiments, customer initiated module 220*a* may receive such designations from customers and determine the type of designation received. That is, designation reception module 205 may determine whether the designation is a UPC code, SKU code, bar code reading, photograph, RFID-type identifier, or other type of identification. Upon receiving and identifying the designation, customer initiation module 205 may organize the necessary data and information, if any, to enable resolution of the designation against appropriate database(s), for example, to identify the desired product or service or transaction that is to receive the benefit or transaction.

System initiated module 220*b* may, in some embodiments, dynamically identify particular benefits or rewards that may be applied to select customer transactions. In some embodiments, system initiation module 220*b* may evaluate a customer's particulars (e.g., data or information relating to the identity of the customer or his or her customer terminal) and dynamically identify transactions that may be eligible for a benefit or reward. In some embodiments, transactions may be identified based on customer preferences, frequency, cost, merchant, product or service purchase, or any other data or information that may be used to identify a transaction. In some embodiments, system initiated module 220b may identify benefits or rewards that may be applicable to the transactions identified. In some embodiments, benefits or rewards identified may be based on customer behavior, customer preferences, transaction history or reward program history (e.g., redemption history, reward earnings history, earning levels, merchant or vendor information, or any information or data or information that may be used to identify benefits or rewards that may be rewarded to a customer, such as pauses, for example, according to the systems and methods described herein. In some embodiments, a plurality of benefits or rewards may be rewarded to a customer, and the customer may be determine which benefit(s) or reward(s) should be applied.

Customer benefit account module 225 may, in some embodiments, determine, store and maintain benefits or rewards that a customer has available to apply to his or her transactions. For example, customer benefit account module 225 may reward a customer with benefits or rewards based on particulars of the customer, such as, for example, the customer's transaction history, location of the customer, or any other data or information associated with the customer that may be used to associate customer's benefits or rewards. In some embodiments, benefits or rewards may also be rewarded according to customer preferences. For example, customer benefit account module 225 may reward a customer with x designations (or pauses) which the customer could then apply to any transactions the customer sees fit. In some embodiments, customer benefit account module 225 may specify that a customer may designate up to $x in individual/collective transaction costs. Thus, the customer could make any number of designations so long as the transactions selected do not individually/collectively surpass $x. In some embodiments, customer benefit account module 225 may place limitations on the designations rewarded. For example, customer benefit account module 225 may specify that the x designations be used within a predetermined period of time, such as, over the next twelve months, for example. Other limitations are of course possible. In some embodiments, a customer may lose available benefits or rewards if a predetermined requirement is not met. For example, if the customer ceases to be a preferred customer for one reason or another, misses too many payments, or otherwise becomes a risky customer.

Benefit expiration module 230 may, in some embodiments, administer the expiration of benefits or rewards that have been applied to particular transactions. In some embodiments, a benefit or reward may expire once a period of time passes or an event occurs. For example, a zero interest rate applied to a transaction may expire after 6 months, or upon the customer making payment on half or other percentage of the total amount. In some embodiments, benefit expiration module 230 may also administer other limitations that may be associated with particular benefits, rewards, customers or transactions. In some embodiments, additional pauses may be used to extend a benefit, such as, for example, extend zero interest for an additional 6 months. In some embodiments, if a transaction to which a benefit has been applied is withdrawn (e.g., a purchased good is returned), the benefit applied to the transaction may be removed.

Customer communication module 235 may, in some embodiments, enable communication between transaction benefit station 105 and a customer. For example, customer communication module 235 may enable the transmission of data and information to the customer (e.g., to customer station 115) in connection with the identity and application of benefits or rewards to particular transactions. In addition, customer communication module 235 may inform a customer of the available benefits or rewards, including any limitations associated with those benefits or rewards, such as, for example, a time period during which they must be used or the types of transactions that may not be selected. Other data and information may of course be exchanged. In some embodiments, customer communication module 235 may process or maintain data and information relating to customers, such as, for example, the identity of the customer, the location (e.g., residential or work address) of the customer, the customer's preferred or favorite merchants, products or services, the card(s) associated with the customer, the reward programs associated with the customer, or any other biographical or demographic information that may be used to dynamically identify customers and/or reward programs that may be used to identify and apply benefits or rewards to transactions according to the systems and methods described herein. In some embodiments, customer communication module may cooperate with benefits reward module 215 to associate particular customers with particular benefits or rewards to enable the various systems and methods described herein, particularly to dynamically identify and apply benefits or rewards to select transactions.

Merchant/transaction communication module 240 may, in some embodiments, enable communication between transaction benefit station 105 and a merchant. For example, merchant communication module 240 may communicate with the merchant where the customer is currently shopping to confirm transaction particulars, such as purchase amount, product or service purchased, and other relevant information. In some embodiments, merchant communication module 240 may also present the merchant with benefit or reward data or information that the merchant may need to know. For example, if the merchant and administrator of transaction benefits station 105 collaborate on offering benefits and rewards to customers, the merchant may need to know about the customer designations and selections. In some embodiments, a merchant may need to know the type of transaction undertaken (e.g., a private label card transaction.) so that it may offer the customer relevant promotions, rewards or benefits. In some embodiments, a merchant may be informed that it is able to offer a customer a promotion that may include the ability to selectively or dynamically receive benefits or rewards in the manner described herein. For example, a particular retailer may offer an incoming customer benefits and rewards (e.g., a certain number of pauses) based on his association with the bank, for example, or other individual or entity that is administering the various features and functionality set forth herein.

In some embodiments, benefits or rewards may be randomly given such that the customer has a certain chance of receive the benefit or reward upon entering into a transaction. The chance that the benefit or reward would be applied may be based on particulars of the transaction or other factors, such as, for example, the factors set forth herein. Thus, if a customer is about to purchase a T.V., there may be a 50% chance that the customer will receive a pause, for example, on the balance resulting from the purchase.

Administration module 245 may, in some embodiments, enable an administrator of transaction benefit station 105, for example, to interact with the various modules, features and functionality described herein. For example, an agent of transaction benefit station 105 may interact with administration module 250 to input, revise and remove data and information used by the various systems and methods described herein, such as, for example, customer information, benefit or reward information, transaction history information, merchant information, or any other data or information that may be used to perform the various features and functionality described herein. In some embodiments, administration module 245 may enable an administrator of transaction benefit station 105 to establish parameters or rules associated with the various features and functionality described herein. For example, an administrator may establish limits, caps, delays, rules or fees associated with a customer's use of the features and functionality described herein. Thus, a customer may be limited to a predetermined number of transaction benefit designations over a predetermined period of time, such as annually or monthly, for example. Other predetermined periods of time are of course possible. A customer may also be required to pay a fee to be able to be able to make transaction benefit designations as described herein. Such a fee may be, for example, annually or monthly imposed or may be charged on a one-time or per-transaction basis. In some embodiments, the fee may comprise a monetary amount, reward points or value, or any other form of measurable value. In some embodiments, delays may be imposed to verify that a particular benefit designation was done properly and in good-faith.

Benefit application module 250 may, in some embodiments, carry out the functionality necessary to apply a benefit or reward to a transaction. For example, if a customer designates a supermarket transaction to receive a benefit or reward, benefit application module 250 may perform the necessary functionality to ensure that the benefit or reward is properly applied. Thus, if the benefit or reward is a reduced interest rate, benefit application module may perform the necessary calculations to ensure that the correct interest rate is determined and applied. In some embodiments, a benefit or reward may comprise a payment holiday, for example, during which date or period of time interest does not accrue or a payment is not due. In some embodiments, a benefit or reward may be applied as a rewards points, monetary value, items available for redemption, access to exclusive events, or other rewards or benefits, for example.

Forecast module 252 may, in some embodiments, forecast a customer's future financial circumstances based on hypothetical scenario(s) provided by the customer or generated by forecast module 252. For example, the customer may provide that he intends to make a purchase of a certain good for a certain amount. Forecast module 252 may then inform the customer of the particular benefit(s) or reward(s) the customer may have available. Scenario(s) provided by the customer may include without limitation, for example, expected transactions, expected payments, expected balances, or any other data or information that may be used to forecast the customer's future financial circumstance. In some embodiments, forecast module 252 may generate such forecasts on its own and inform the customer about possible rewards or benefits. For example, forecast module 252 may inform the customer of how much money may be saved by pausing certain transactions over others. Other forecasts are of course possible.

Figure 3:
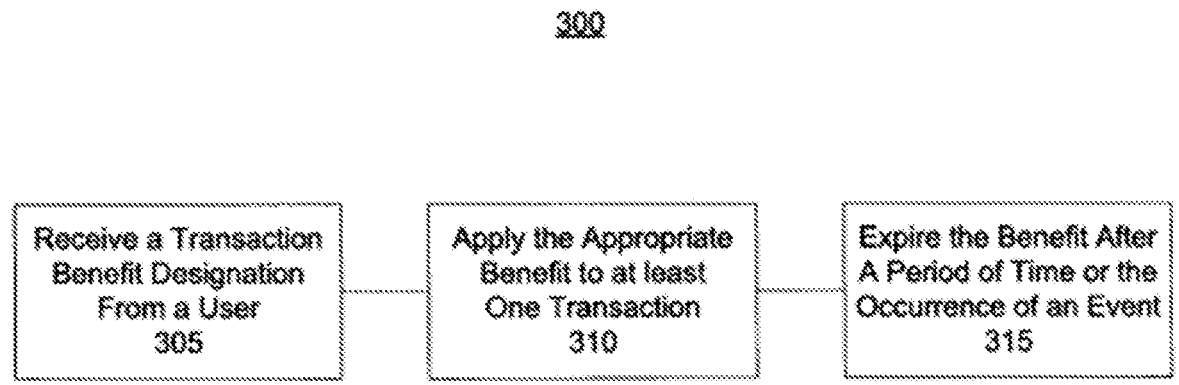
FIG. 3 illustrates an exemplary process flow 300 for applying benefits to transactions, according to various embodiments.

FIG. 3 illustrates a general process flow 300 for conducting a transaction according to an embodiment of the systems and methods described herein. At step 305, a transaction benefit designation is received from a customer that may be shopping at a retail store, for example, browsing online, reviewing a statement, or performing any other activity where the customer has the ability to identify transactions (past, present or future) that should receive a benefit or reward and thereafter transmit a transaction benefit designation to transaction benefit station 105 as described herein. For example, a customer visiting a store may come across a bicycle that he is interested in purchasing and transmits, via consumer station 115, for example, the bicycle's UPC code (or other identifier), the name of the store, or other identifier that could be used to identify the transaction to the transaction benefit station 105. In some embodiments, the customer may transmit any identifier associated with the bicycle that would enable transaction benefit station 105 to identify the bicycle.

In some embodiments, notifications can be sent to the customer informing the customer of pauses that are available for redemption based on the customer's transaction history. For example, a customer making a purchase at a sporting goods store may receive a message, call or other notification on the customer's telephone, computer, personal digital assistant (PDA) informing the customer that certain pauses (or other benefits or rewards) are available to be applied to the purchase transaction. In some embodiments, the notification may be sent to the check-out assistant's terminal (e.g., POS terminal) who then informs the customer of the benefits or rewards available for redemption. The customer, upon receiving the notification, may indicate whether the pause, benefit or reward should be applied or declined, for example. The customer's indications may be provided through he telephone (e.g., by calling a customer service representative), through the PDA, by informing the check-out assistant, or any other technique through which the customer may manifest his or her preference(s).

At step 310, upon receiving the transaction benefit designation, transaction benefit station 105 may identify the particular transaction and determine and apply an appropriate benefit or reward, if any. For example, in the above example, the UPC code received from the customer may be parsed from the customer's transmission and resolved against a database of UPC codes to identify the bicycle purchased by the customer. Transaction benefit station 105 may then scan customer transactions reflected in the customer's statement—if and when generated—for a transaction involving the bicycle. In some embodiments, the designation received from the customer may comprise any and all information corresponding to the transaction, such as, for example, the name of the bicycle, the store where purchased, date of the transaction and transaction amount. The transaction may also be identified based on information received from the merchant or agent thereof, such as, for example, any information contained in a payment or transaction verification request. In either case, upon identifying the transaction, transaction benefit station 105 may then identify at least one benefit or reward that can be applied to the transaction. In some embodiments, a benefit or reward may be determined randomly, while in some embodiments, the benefit or reward is determined based on a rule or other parameter for determining selection and application of benefits or rewards. In some embodiments, the benefit or reward may be based on the identity of the customer or any transaction particular. In some embodiments, if more than one benefit or reward is applicable, transaction benefit station 105 may query the customer for a preference or select one or more randomly or based on some rule or parameter. Upon receiving a preference from the customer, transaction benefit station 105 may apply the benefit(s) or reward(s) to the transaction. Other designations and identifiers may also be resolved against appropriate databases to identify the desired product and identify appropriate benefits or rewards.

At step 315, transaction benefit station 105 may determine whether the benefit or reward applied has any associated limitations. In some embodiments, transaction benefit station 105 may expire the benefit or reward if the associated limitation has been met. For example, transaction benefit station 105 may expire the benefit of a lower interest rate if such rate was only to remain in effect for 6 months. In some embodiments, benefit expiration module 230 may also administer other limitations that may be associated with particular benefits, rewards, customers or transactions. In some embodiments, a benefit may be applied to an upcoming or expected transaction. For example, an individual may inquire about the availability of benefits to apply to transactions associated with an upcoming vacation or other expense.

Figure 4:
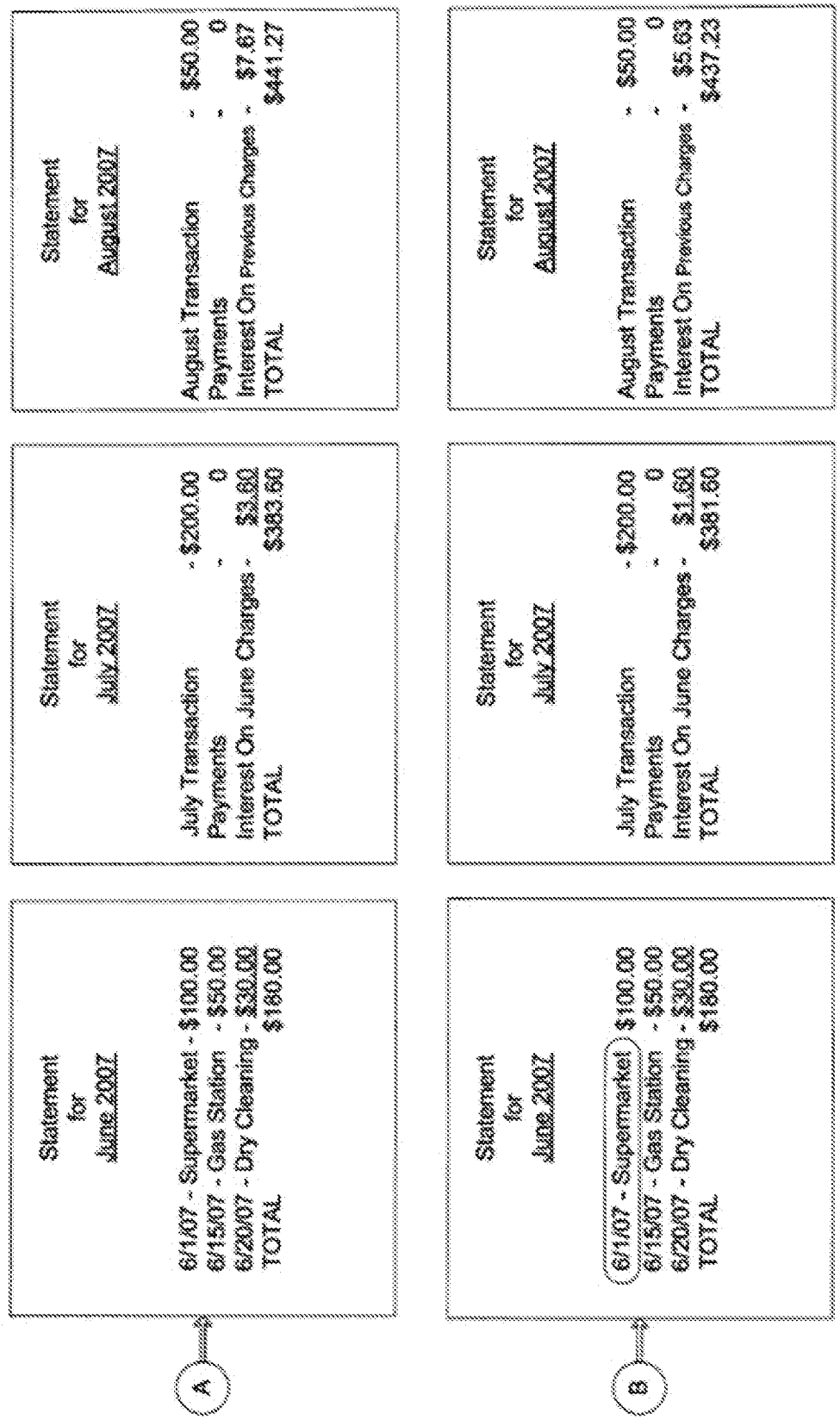
FIG. 4 illustrates exemplary process flows 400 illustrating statements reflecting the accrual of interest on transactions, according to various embodiments.

FIG. 4 illustrates detailed statements 400A and 400B that reflect the accrual of interest on purchases made by a customer. As shown, statements 400A depict the accrual of interest as currently occurs in prior art systems and methods, whereas 400B depicts the accrual of interest upon a customer designating a particular benefit or reward be applied to a select transaction.

FIG. 400A depicts the accrual of interest in normal course. For example, the customer's June statement indicates that on Jun. 1, 2007 the customer spent $100.00 on groceries at a supermarket. On Jun. 15, 2007 the customer spent $50.00 on gasoline at a gasoline station. On Jun. 20, 2007 the customer spent $30.00 on dry cleaning services. The total for June 2007 is $180.00. Next, the July 2007 statement reflects a total of $200.00 on transactions spent in July. Zero payments were made on the account. An interest charge of $3.60 which is based on a hypothetical monthly rate of 2%. Thus, the $3.60 is 2% of the $180.00 balance incurred in June. The total for July 2007 is therefore $383.60. The customer's August 2007 statement reflects August transactions totaling $50.00, zero payments, and interest charges totaling $7.67 for the total balance ($383.60) from the July 2007 statement based on the 2% monthly interest rate. The total for August 2007, therefore, is $441.27.

FIG. 4B depicts the same purchase transactions for June-August 2007 except that the customer designates the June 2007 $100 supermarket transaction as the beneficiary of zero interest rate. Accordingly, the interest rate incurred in July 2007 is only $1.60 given that the $100 supermarket transaction is not considered in the interest calculation. Thus, $1.60 interest is based on 2% of $80.00. Assuming the benefit on the supermarket transaction has not expired, the interest incurred in August would also be less because the $100 is again deducted from the July balance that is used to determine the interest charge. Thus, 2% of $281.60 is equal to $5.63. Of course, the above example assumes that the benefit applied to the supermarket transaction does not expire is not changed by the customer during the months of June or August.

In addition, in some embodiments, the customer may cancel the designation, designate a different beneficiary, designate only a portion of a transaction as a beneficiary (e.g., $50.00 of the $100.00 transaction cost), or add additional benefits to a particular transaction. For example, the customer may cancel the zero interest rate on the supermarket transaction at which point interest would start accruing on the transaction. Likewise, the customer may switch the benefit from the supermarket transaction to the gas station or dry cleaners transaction or any other transaction from July or August. Similarly, the customer may specify that only a percentage of the supermarket transaction may benefit from zero interest. In addition, the customer may add another benefit or reward to the supermarket transaction, such as, for example, delaying the payment due date, which in some embodiments, may result in the supermarket transaction cost of $100 from dropping off the statements until such time as the benefit expires and the transaction becomes due. Of course, these options may be invoked by a customer to manage and administer his or her allocated benefit designation rights that may accrue over time.

Figure 5:
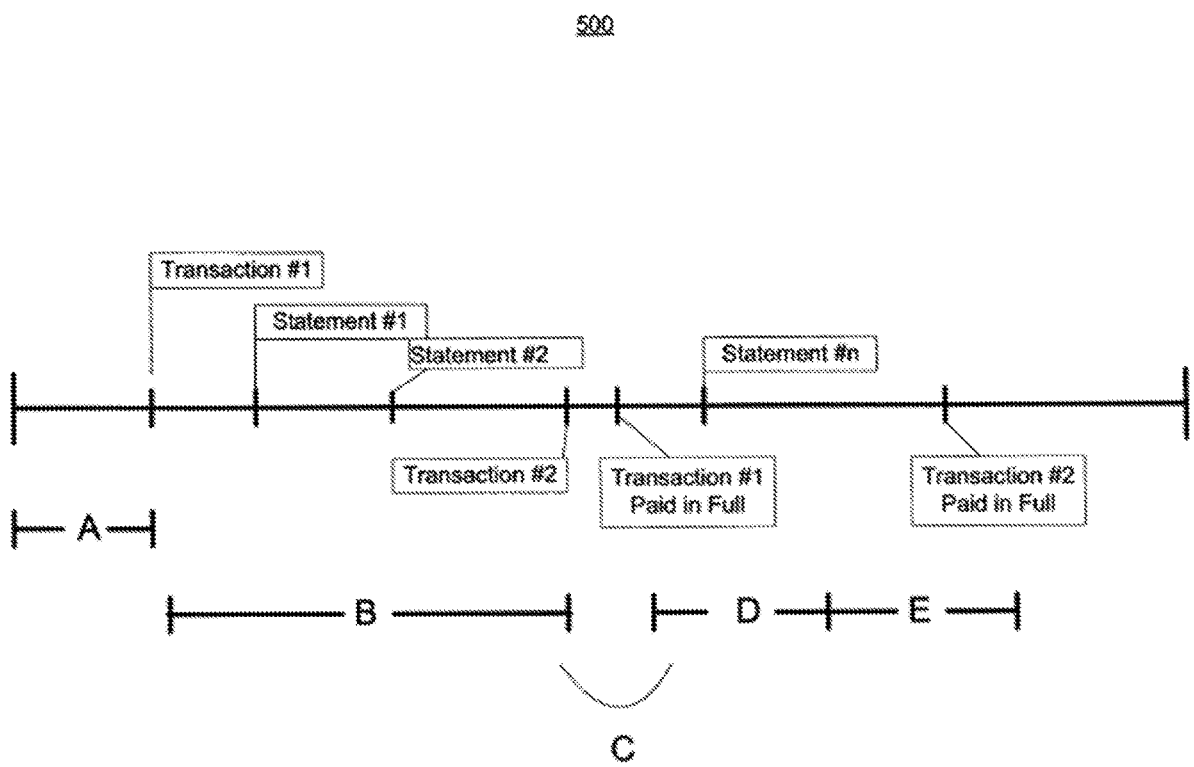
FIG. 5 illustrates an exemplary process flow 500 for applying benefits to transactions, according to various embodiments.

FIG. 5 illustrates an exemplary timeline 500 which depicts several events related to the designation of benefits or rewards using the system and methods described herein. Starting from the left-most point, time frame A designates a period of time prior to transaction #1. During time period A customer (or merchant or other appropriate third party) may designate particulars concerning which transactions it prefers receive benefits or rewards, preferences on the types of benefits or rewards it would like to receive, and any data or information that may be relied upon to issue benefits and rewards as described herein. In some embodiments, the customer's designations may be transmitted to transaction benefit station 105 for processing as described herein.

As shown, the customer eventually enters into transaction #1 and the period of time B commences. During time period B, the customer may expressly designate transaction #1 as the beneficiary of a benefit or reward. In some embodiments, transaction benefit station 105 may itself identify transaction #1 as a beneficiary based on, for example, customer preferences or transaction history. Assume for purposes of this example that the benefit is applied to transaction #1 along with a limitation that it will expire after n months. Also during time B, periodic statements may be issued to the customer that reflect the customer's transaction history and, as appropriate, application of the benefit to transaction #1. As shown, time B results in the issuance of statement #1 and statement #2, which are issued on a monthly basis. Also during time B, the customer may also revise his designations, such as, for example, canceling or adding to the benefit or changing the allocation of benefits across any number of transactions. In some embodiments, transaction benefit station 105 may itself revise, cancel or add to benefits based on, for example, customer preferences or transaction history.

At the beginning of time C, the customer enters into a transaction #2. A short time later, the customer may pay off transaction #1. At this point the customer may leave his designation alone (e.g., let it expire upon paying off transaction #1) or revise it as he sees fit (e.g., assigning it to another transaction). In this example, assume the customer cancels the benefit to transaction #1 after paying it off (which commences time D) and applies what is left of it to transaction #2. In some embodiments, the reassignment of the benefit to transaction #2 may result in a new limitation of n months from the date it is assigned to transaction #2, while in some embodiments the benefit will expire n months from when it was first assigned to transaction #1. Assuming the latter, the customer will experience the benefit on transaction #2 until statement #n issues (e.g., n months from when the benefit was first assigned to transaction #1). During period of time C and D, the customer may revise, cancel or add to the benefit as he sees fit. In some embodiments, transaction benefit station 105 may itself revise, cancel or add to benefits based on, for example, customer preferences or transaction history. Once statement #n issues, the benefit to transaction #2 expires. At and after this point, when time E commences, the customer may add new designations to transaction #2 as is available to him. This new benefit may be the same or different than the original benefit that was assigned to transaction #1 and subsequently assigned to transaction #2. The new benefit may have limitations or may persist indefinitely. In some embodiments, the benefit may expire upon transaction #2 being paid in full.

In some embodiments, at any time during the time periods shown in FIG. 5, the customer may query transaction benefit station 105 for forecasts on the customer's future financial situation based on any number of financial scenarios, such as set forth above in connection with forecast module 252, for example. In some embodiments, such query may be presented via customer station 115, for example.

Of course, the hypothetical described above may also contemplate the application of benefits to desired percentages of transactions such that transaction #1, for example, would only receive a benefit on 50% of the cost. The precise allocation of benefits may be determined by the customer or dynamically by transaction benefit station 105 based on, for example, customer preferences or transaction history.

Figure 6:
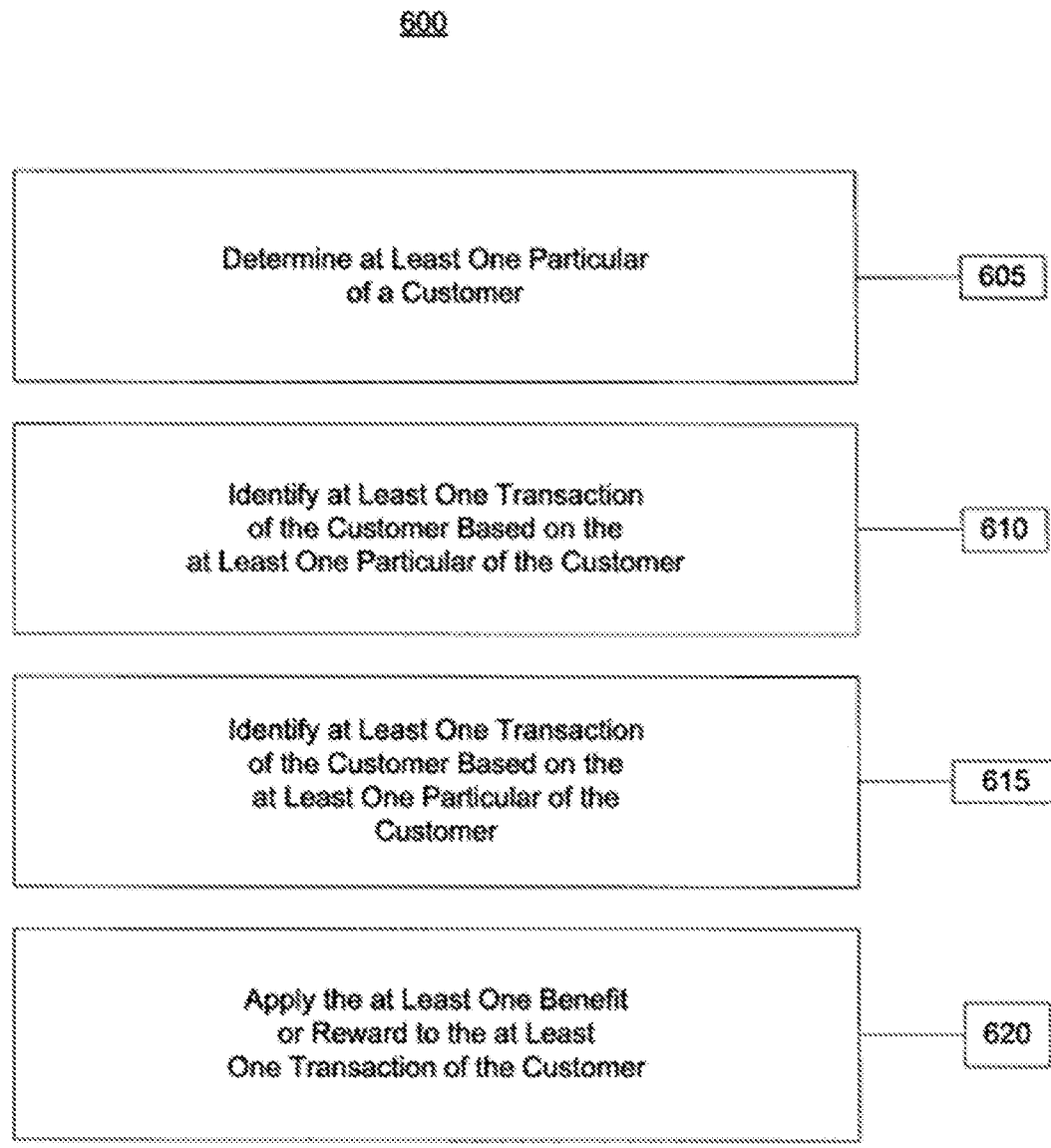
FIG. 6 illustrates a process flow 600 for dynamically identifying and applying benefits to transactions, according to various embodiments.
Figure 7:
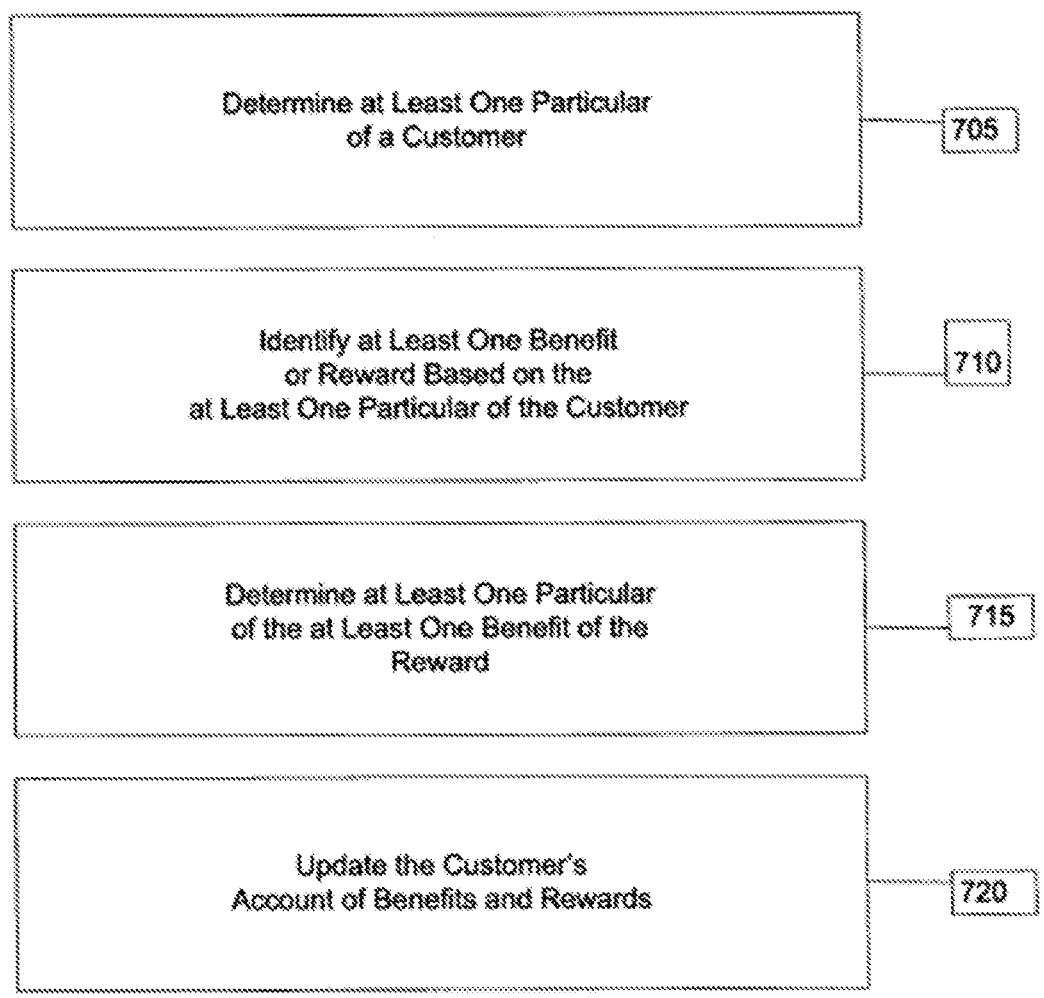
FIG. 7 illustrates a process flow 700 for identifying benefits, according to various embodiments.

FIGS. 6 and 7 generally illustrate typical process flows performed by the systems described herein for identifying and applying benefits or rewards to transactions:

FIG. 6 illustrates a process flow 600 for dynamically identifying and applying a benefit or reward to at least one transaction according to an embodiment. At step 605, at least one particular of a customer is determined. In some embodiments, a particular may comprise the customer's identification or preferences related to the identification and application of benefits or rewards as described herein. At step 610, at least one benefit or reward is identified based on the at least one particular of the customer. At step 615, at least one transaction of the customer is identified based on the at least one particular of the customer. At step 620, the at least one benefit or reward is applied to the at least one transaction of the customer.

FIG. 7 illustrates a process flow 700 for identifying benefits, according to various embodiments. At step 705, at least one particular of a customer is determined. At step 710, at least one benefit or reward is identified based on the at least one particular of the customer. At step 715, at least one particular of the at least one benefit or reward is determined. In some embodiments, the particular may comprise a limitation associated with the benefit or reward. For example, a benefit or reward may only be available: in select geographic areas, to select customers, select merchants, for redemption within a specified time period; for select promotions or programs; or according to any other limitation or requirement that may, for example, determine where, to whom or under what circumstances a benefit or reward is available. At step 720, the customer's account of benefits and rewards may be updated.

Figure 8:
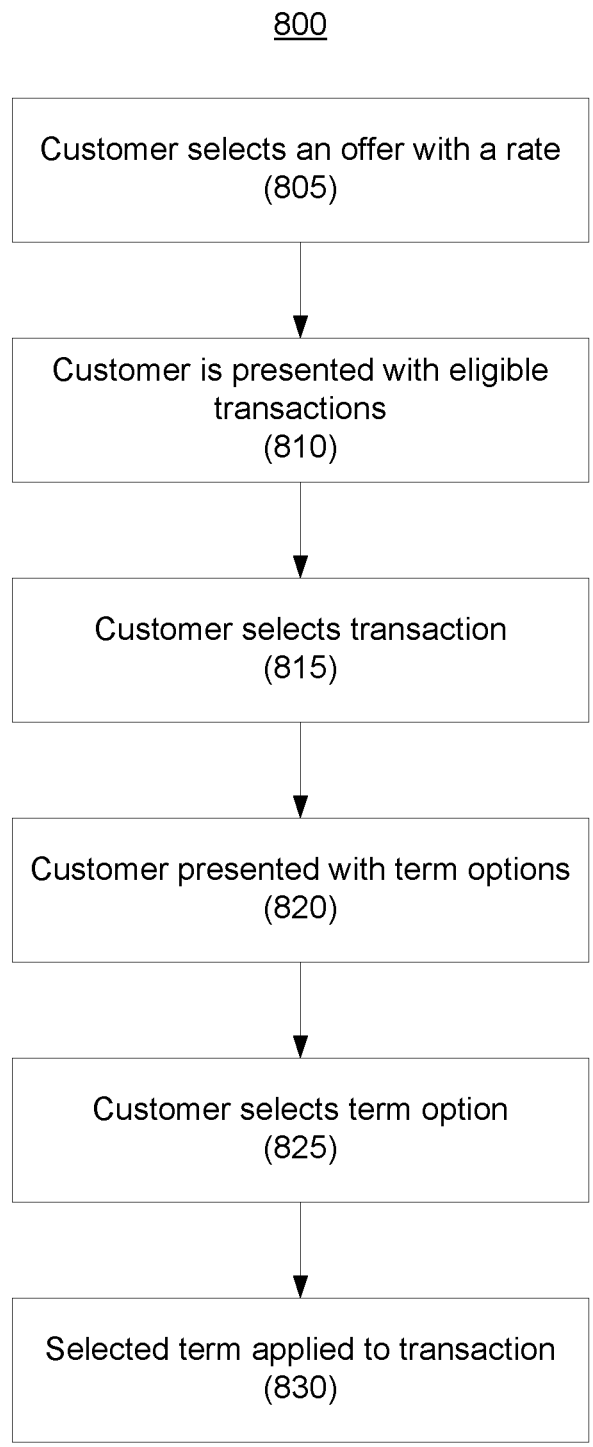
FIG. 8 illustrates a process flow 700 for identifying and processing an offer according to various embodiments.

In one embodiment, a customer may be offered unsecured credit to finance some or all of an anticipated, a pending, or a completed transaction. For example, a customer may be presented with an "always on" or "always available" offer to apply a special rate to one or more completed transactions. Referring to FIG. 8, a method for applying a promotion to a completed transaction is disclosed according to one embodiment.

In step 805, a customer may select an offer for unsecured credit with a rate. In one embodiment, the offer may be presented, for example, on the customer's mobile electronic device via a payment application, a mobile wallet, a financial institution's application, a financial institution's website, etc. In another embodiment, the offer may be presented on any other suitable device (e.g., desktop computer, notebook computer, tablet computer, ATM, kiosk, etc.).

In one embodiment, the offer may be an "Always On" offer, an "Always Available" offer, etc.; that is, an offer that is substantially always available for the customer.

In one embodiment, the rate may be below an interest rate for a credit instrument that the customer may possess.

In one embodiment, the offer may require minimum payments over the term; in another embodiment, the offer may not require any payments until the completion of the term. Any other suitable conditions for the offer may be used as necessary and/or desired.

In step 810, the customer may be presented with one or more transactions that are eligible for the offer. In one embodiment, the transactions may be selected for presentation based on transaction amount (e.g., a floor amount, a ceiling amount, etc.), the merchant with which the transaction with conducted, how long ago the transaction was conducted, a combination thereof, etc. The transaction(s) may be selected for presentation using any suitable basis that is necessary and/or desired.

In step 815, the customer may select one of the eligible transactions for the offer. The selection may be made in any suitable manner (e.g., touch, click, etc.).

In step 820, the customer may be presented with one or more term option for the offer. In one embodiment, a minimum term (e.g., 1 month) and a maximum term (e.g., 6 months) may be presented, along with one or more term between the two (e.g. 2 months, 3 months, 4, months, 5 months).

In one embodiment, the interest cost associated with each term may be presented.

In step 825, the customer may select the term option using any suitable method.

In step 830, the selected term and rate may be applied to the selected transaction. In one embodiment, the transaction may be removed from the customer's credit card balance.

In one embodiment, automated payments (e.g., minimum payments) may be scheduled and processed automatically if required.

Figure 9:
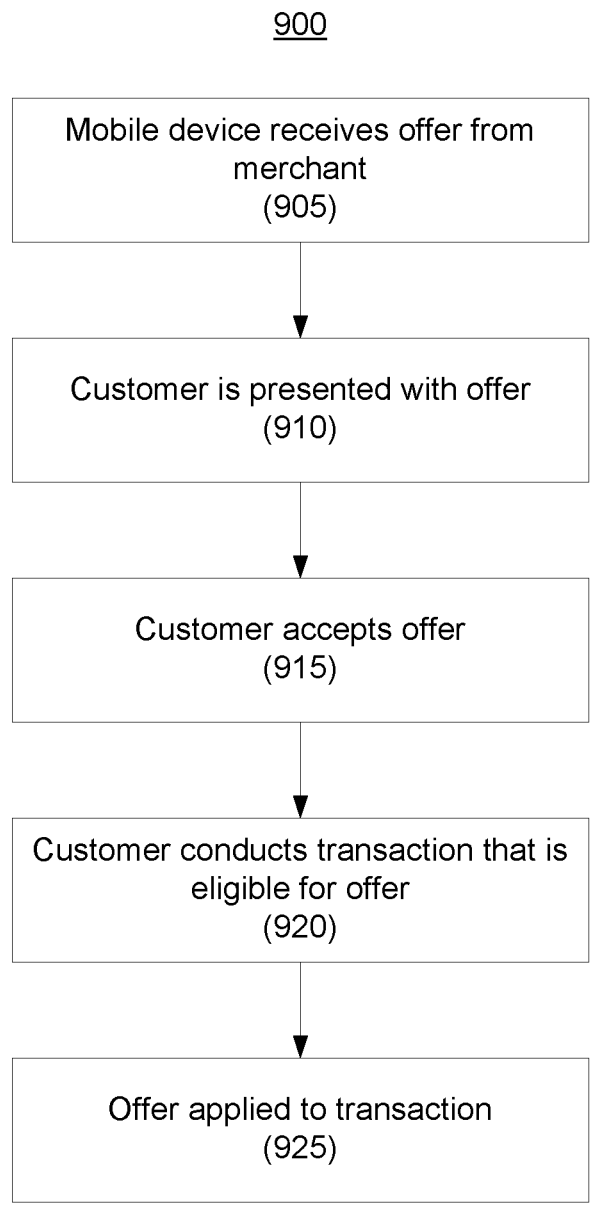
FIG. 9 illustrates a process flow 800 for identifying and processing an offer according to various embodiments.

Referring to FIG. 9, an offer may be presented to a customer based on the location of the customer's mobile electronic device. In step 905, a customer's mobile electronic device may receive an offer from a merchant. For example, the offer may be presented based on a physical location of the mobile electronic device (e.g., by GPS), by a beacon (e.g., a merchant broadcast), based on an anticipated location of the mobile electronic device, by manual entry, etc.

Examples of the use of beacons and GPS are disclosed in U.S. patent application Ser. Nos. 14/816,300; 13/803,298; and 14/744,608. The disclosures of each of these documents is hereby incorporated, by reference, in its entirety.

In step 910, the customer may be presented with the offer as a push message, as a message in an application, in a text message, in an email message, etc.

In one embodiment, the offer may identify at least one rate and at least one term.

In step 915, the customer may accept the offer. In one embodiment, if there is a single rate and term, the customer may accept that rate and term.

In another embodiment, similar to step 820, the customer may be presented with term options, and the customer may select one of the term options. If more than one rate is provided, the customer may select a rate.

In one embodiment, the customer may be presented the offers at a merchant point of transaction, such as a point of sale device.

In step 920, the customer may conduct a transaction that is eligible for the offer. In one embodiment, the customer may conduct the transaction in-person using the financial instrument for which the offer was made. In another embodiment, the customer may conduct the transaction using a financial instrument that the customer may apply for.

In one embodiment, the customer may be offered "instant" credit to conduct the transaction with an account that the customer may apply for. Examples of systems and methods for instant credit are disclosed in U.S. Pat. Nos. 8,078,528; 8,725,611; 8,554,652; 8,190,522; 8,538,876; 8,352,370; U.S. patent application Ser. No. 13/240,262; U.S. patent application Ser. No. 13/803,298; and U.S. patent application Ser. No. 14/744,608. The disclosure of each of these patents and patent applications is hereby incorporated, by reference, in its entirety.

In step 925, the offer may be applied to the transaction. In one embodiment, the transaction may be presented outside the normal transactions with that financial instrument.

Figure 10:
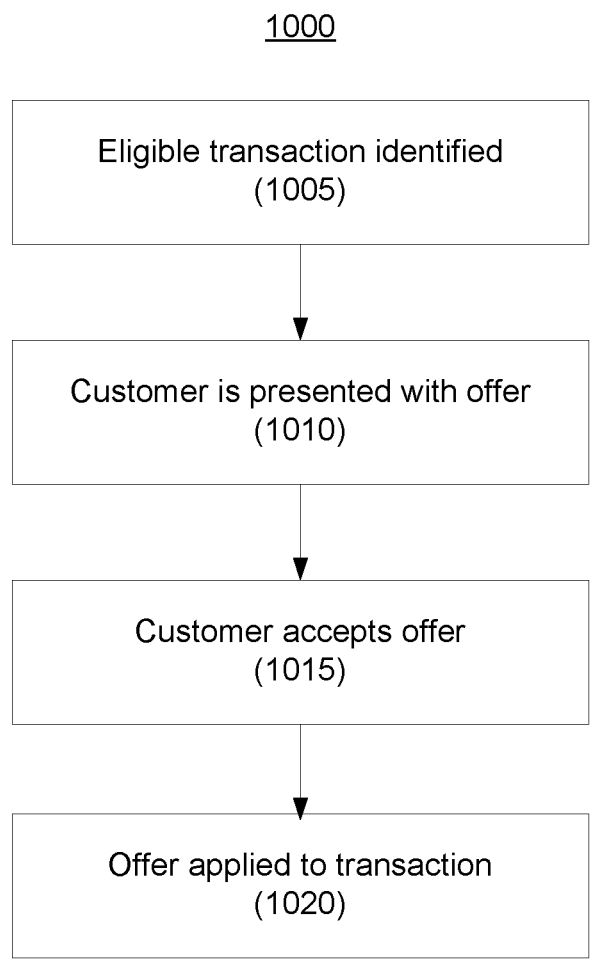
FIG. 10 illustrates a process flow 1000 for identifying and processing an offer according to various embodiments.

Referring to FIG. 10, in one embodiment, an offer may be applied to a transaction that is being conducted. For example, in step 1005, an eligible transaction may be identified. In one embodiment, an eligible transaction may be identified when a customer presents an item and a financial instrument for the transaction. A back-end system at the merchant and/or issuer may identify the item as being eligible for a promotion.

In step 1010, the customer may be presented with the offer as a push message, as a message in an application, in a text message, in an email message, etc.

In one embodiment, the offer may be made on a screen of a point of sale device, an ATM, a website, etc.

In one embodiment, the offer may identify at least one rate and at least one term.

In step 1015, the customer may accept the offer. In one embodiment, if there is a single rate and term, the customer may accept that rate and term. Otherwise, as discussed above, the customer may be presented with term options and/or rate options, and the customer may select one of the term and/or rate options.

In step 1020, the offer may be applied to the transaction, and the transaction may be completed. In one embodiment, the transaction may be presented outside the normal transactions with that financial instrument.

In one embodiment, the offer maybe incorporated to the merchant's checkout process. For example, during checkout, the customer may be presented with any of the offers discussed above.

In one embodiment, the merchant may determine whether to present an offer based on any of the financial instruments that the customer has registered with the merchant.

In another embodiment, the offer may be incorporated into a mobile wallet (e.g., Apple Pay, Samsung Pay, etc.) or payment application (e.g., ChasePay). In one embodiment, the wallet provider may determine the offer to present to the customer based on a financial instrument that is in the customer's wallet.

In another embodiment, the payment application may determine the offer to present to the customer based on customer authentication, credit score, payment history, cost of the transaction (e.g., high dollar purchase), historical use of similar offers, etc.

Hereinafter, aspects of implementation will be described. As described above, FIG. 1 shows embodiments of a system.

The system or portions of the system may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process.

It is appreciated that in order to practice the methods as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method. Rather, any number of different programming languages may be utilized as is necessary or desirable.

Also, the instructions and/or data used in the practice may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope.

Accordingly, while the present invention has been described here in detail in relation to its exemplary embodiments, it is to be understood that this disclosure is only illustrative and exemplary of the present invention and is made to provide an enabling disclosure. Accordingly, the foregoing disclosure is not intended to be construed or to limit the present invention or otherwise to exclude any other such embodiments, adaptations, variations, modifications and equivalent arrangements.

The embodiments of the present inventions are not to be limited in scope by the specific embodiments described herein. For example, although many of the embodiments disclosed herein have been described with reference to transaction benefits or rewards, the principles herein are equally applicable to any type of benefit, reward or otherwise, that may identified and applied to customer behavior. In addition, although many of the embodiments disclosed herein have been described with reference to a transaction benefit station that is associated with an administrator of reward programs, such as a bank, for example, it should be appreciated that various aspects may be accomplished when various system components are located elsewhere or administered by other individuals or entities. For instance, the transaction benefit station 105 described herein may be maintained and administered by a third party service provider. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

What is claimed is:

1. A method of presenting an offer to a customer, comprising:
    receiving, by a computer application executed by a computer processor in a consumer electronic device and from a back end server for a financial institution, an always-on financing offer for a completed transaction that was completed using a financial instrument issued by the financial institution;
    receiving, by the computer application, a selection of the always-on financing offer from the customer and communicating the selection to the back end server for the financial institution;
    receiving, by the computer application and from the back end server, an identification of a plurality of completed transactions conducted with the financial instrument that are eligible for the always-on financing offer and at least one option associated with the always-on financing option;
    graphically presenting, by the computer application and on a display of the consumer electronic device, an icon representing each of the plurality of eligible completed transactions;
    receiving, by the computer application and on the display of the customer electronic device, a first graphical selection of one of the icons, wherein the graphical selection comprises one a checkbox, a toggle switch, and a pushbutton for the icon;
    determining, by the computer application, the selected eligible completed transaction from the first graphical selection;
    graphically presenting, by the computer application and on the display of the customer electronic device, the customer with the at least one option associated with the always-on financing offer;
    receiving, by the computer application, a second graphical selection of one of the options on the display of the customer electronic device, wherein the graphical selection comprises one a checkbox, toggle switch, and a pushbutton;
    determining, by the computer application, the selected option from the second graphical selection; and
    communicating, by the computer application, the selected eligible completed transaction and the selected option to the back end server, wherein the back end server is configured to apply the always-on financial offer with the selected option to the selected eligible completed transaction.

2. The method of claim 1, wherein the eligibility of each of the completed transactions is based on a transaction amount.

3. The method of claim 1, wherein the eligibility of each of the completed transactions is based on a good or service.

4. The method of claim 1, wherein the at least one option comprises a term for the always-on financing offer.

5. The method of claim 1, wherein the computer application presents the customer with a financing cost based on the selected option.

6. The method of claim 1, wherein the financing offer has an interest rate that is lower than an interest rate of an account for the customer.

7. The method of claim 6, wherein the eligibility of the completed transaction is based on a good or service.

8. The method of claim 1, wherein the selected completed transaction is removed from an account associated with the financial instrument.

9. A method for presenting an offer to a customer, comprising:
    receiving, by a computer application executed by a computer processor in a consumer mobile electronic device and from a location sensing device on the customer mobile electronic device, a location of the mobile electronic device;
    identifying, by the computer application, a merchant associated with the location;
    initiating, by the computer application, a communication with the merchant over a communication network;
    receiving, by the computer application, an electronic purchase offer for a good or service from the merchant;
    graphically presenting, by the computer application and on a display of the consumer mobile electronic device, the electronic purchase offer to the customer;
    completing, by the computer application, a transaction for the good or service using a financial instrument issued by a financial institution;
    receiving, by the computer application and from a back end server for the financial institution, an always-on financing offer for the completed transaction;
    graphically presenting by the computer application and on the display of the consumer mobile electronic device, the always-on financing offer for the completed transaction on a display of the customer electronic device;
    receiving, by the computer application and on the display of the customer mobile electronic device, a first graphical selection of acceptance of the always-on financing offer on the display of the customer electronic device, wherein the graphical selection comprises one a checkbox, toggle switch, and a pushbutton;

determining, by the computer application, acceptance of the always-on financing offer from the first graphical selection;

graphically presenting, by the computer application and on the display of the customer mobile electronic device, the customer with at least one option associated with the always-on financing offer on the display of the customer electronic device;

receiving, by the computer application, a second graphical selection of one of the options on the display of the customer electronic device, wherein the graphical selection comprises one a checkbox, toggle switch, and a pushbutton;

determining, by the computer application, the selected option from the second graphical selection; and communicating, by the computer application, the completed transaction and the selected option to the back end server, wherein the back end server is configured to apply the always-on financial offer with the selected option to the completed transaction.

10. The method of claim 9, further comprising:
the computer application broadcasting a query; and
the computer application receiving, from the merchant, a response to the query.

11. The method of claim 10, wherein the response comprises the purchase offer.

12. The method of claim 9, wherein the purchase offer is part of a beacon broadcast.

13. The method of claim 9, wherein the transaction is removed from an account associated with the financial instrument.

14. The method of claim 9, wherein the computer application is a payment application, and the purchase offer is presented in the payment application.

15. A method for presenting an offer to a customer, comprising:

receiving, by a computer application executed by a computer processor in a financial institution backend and over a payment network, a plurality of completed transactions conducted by the customer with a merchant using a financial instrument issued by the financial institution;

determining, by the computer application, that the plurality of completed transactions are eligible for an always-on financing offer;

providing, by the computer application, the always-on financing offer for the plurality of completed transactions to customer electronic device, wherein the customer electronic device graphically presents each of the plurality of eligible completed transactions as icons on a display of the customer electronic device;

receiving, by the computer application, acceptance of the always-on financing offer from the customer electronic device for one of the completed transactions, wherein the acceptance is received as a first graphical selection on the display of the customer electronic device comprising one a checkbox, toggle switch, and a pushbutton;

communicating, by the computer application, at least one option for the always-on financing offer to the customer electronic device, wherein the customer electronic device graphically presents the at least one option on the display of the customer electronic device;

receiving, by the computer application, a selection of one of the options from the customer electronic device, wherein the selection is received as a second graphical selection on the display of the customer electronic device comprising one a checkbox, toggle switch, and a pushbutton; and applying, by the computer application, the accepted always-on financing offer and the selected option to the completed transaction.

16. The method of claim 15, wherein the eligibility of the completed transaction is based on a transaction amount.

17. The method of claim 15, wherein the at least one option comprises a term for the always-on financing offer.

18. The method of claim 15, wherein the acceptance of the always-on financing offer is received from a computer application executed by a computer processor in an electronic device.

* * * * *